US009598591B2

United States Patent
Mizutani et al.

(10) Patent No.: US 9,598,591 B2
(45) Date of Patent: Mar. 21, 2017

(54) INK SET AND PRINTED MATERIAL

(71) Applicant: SAKATA INX CORP., Osaka-shi, Osaka (JP)

(72) Inventors: Shinya Mizutani, Osaka (JP); Tadashi Hirose, Osaka (JP); Takuya Myose, Osaka (JP)

(73) Assignee: SAKATA INX CORP., Osaka (JP)

( * ) Notice: Subject to any disclaimer, the term of this patent is extended or adjusted under 35 U.S.C. 154(b) by 146 days.

(21) Appl. No.: 14/437,736

(22) PCT Filed: Oct. 24, 2013

(86) PCT No.: PCT/JP2013/078805
§ 371 (c)(1),
(2) Date: Apr. 22, 2015

(87) PCT Pub. No.: WO2014/065362
PCT Pub. Date: May 1, 2014

(65) Prior Publication Data
US 2015/0291819 A1    Oct. 15, 2015

(30) Foreign Application Priority Data
Oct. 24, 2012    (JP) .................................. 2012-235097

(51) Int. Cl.
| C09D 11/10 | (2014.01) |
| C09D 11/40 | (2014.01) |
| C08F 2/50 | (2006.01) |
| C09D 11/101 | (2014.01) |
| C09D 11/322 | (2014.01) |
| C09D 11/107 | (2014.01) |

(52) U.S. Cl.
CPC ............ *C09D 11/40* (2013.01); *C09D 11/101* (2013.01); *C09D 11/107* (2013.01); *C09D 11/322* (2013.01)

(58) Field of Classification Search
CPC ..... C09D 11/101; C09D 11/40; C09D 11/107; C09D 11/322
See application file for complete search history.

(56) References Cited

U.S. PATENT DOCUMENTS

| 6,564,142 B2 * | 5/2003 | Godwin ................ G01M 1/125 |
| | | 701/120 |
| 9,056,986 B2 * | 6/2015 | Kagose .................... C09D 4/00 |
| 2011/0236647 A1 | 9/2011 | Tsuchiya et al. |
| 2012/0113201 A1 | 5/2012 | Kagose et al. |
| 2012/0133059 A1 * | 5/2012 | Ito ........................ C09D 11/322 |
| | | 257/788 |
| 2012/0270018 A1 | 10/2012 | Mizutani et al. |
| 2012/0274717 A1 * | 11/2012 | Nakano ................ C09D 11/101 |
| | | 347/102 |
| 2013/0321520 A1 * | 12/2013 | Ito .......................... C09D 11/40 |
| | | 347/20 |
| 2015/0240094 A1 * | 8/2015 | Kagose .................... C09D 4/00 |
| | | 522/26 |

FOREIGN PATENT DOCUMENTS

| EP | 2 876 142 | 5/2015 |
| EP | 2 924 080 | 9/2015 |
| JP | 2004-067991 | 3/2004 |
| JP | 2006-169419 | 6/2006 |
| JP | 2009-035650 | 2/2009 |
| JP | 2012-092291 | 5/2012 |
| JP | 2012-102295 | 5/2012 |
| JP | 2012-116934 | 6/2012 |
| JP | 2012-126885 | 7/2012 |
| JP | 2012-140583 | 7/2012 |
| WO | 2009/148124 | 12/2009 |
| WO | 2010/143738 | 12/2010 |

\* cited by examiner

*Primary Examiner* — Sanza McClendon
(74) *Attorney, Agent, or Firm* — Hamre, Schumann, Mueller & Larson, P.C.

(57) ABSTRACT

Provided is an ink set having excellent curing properties under LED light, providing printed matter that does not fade or discolor due to a photopolymerization initiator, suppressing color bleeding during image forming, exhibiting favorable adhesion towards a polyvinyl chloride sheet, enabling cock ring to be efficiently suppressed, and demonstrating an extremely low viscosity, high flash point and low skin irritation. The present invention pertains to an ink set containing at least two compositions selected from the group consisting of a yellow ink composition, a magenta ink composition, a cyan ink composition, a black ink composition, a white ink composition, and a clear ink composition, the compositions having the predetermined structure as specified in claim 1, wherein the flash point of the ink compositions is 70° C. or higher, and the viscosity (25° C.) is 5 mPa-s or lower.

3 Claims, No Drawings

INK SET AND PRINTED MATERIAL

TECHNICAL FIELD

The present invention relates to an ink set including photocurable ink compositions for ink jet printing which have very low viscosity as well as a high flash point and low skin irritation. In particular, the present invention relates to an ink set which has excellent curability, gives a printed material without coloration or color deterioration due to a photoinitiator, prevents color mixing in image formation, has good adhesion to polyvinyl chloride-based sheets, and sufficiently prevents cockling. The present invention also relates to a printed material obtained using the ink set.

BACKGROUND ART

Inkjet recording methods have been increasingly used these days in fields such as production of large-sized, outdoor advertisements requiring a large image area. Base materials usable for such large-sized, outdoor advertisements are tough polyvinyl chloride-based sheets that withstand outdoor use, such as sheets made of vinyl chloride resin alone or sheets made of tarpaulin, a composite material containing vinyl chloride. Some ink compositions for inkjet printing usable for printing on these polyvinyl chloride-based sheets have been proposed. For example, Patent Literatures 1 and 2 disclose photocurable ink compositions free of volatile components.

The ink compositions for inkjet printing of Patent Literatures 1 and 2 are designed to be cured using a general-type light source that emits high energy light (shorter wavelength), such as a metal halide lamp. In the case of high energy light, which has a high ability to cure ink compositions for inkjet printing, it is sufficient for the ink composition to have curability appropriate to the high curing ability.

Use of such a general-type light source, however, suffers from environmental disadvantages such as the generation of ozone and equipment disadvantages such as increased size of the radiation device and a short lamp life. Thus, a light emitting diode lamp (LED lamp, light emitted from a light emitting diode lamp is also referred as "LED light" hereinafter) that emits low energy light (longer wavelength) has recently been used as a light source for curing an ink composition for inkjet printing.

The use of LED lamps requires an ink composition for inkjet printing to have sufficient curability and printing properties (e.g., improved adhesion, reduction of cockling) under low energy light. Such improvement in photocurability generally involves reduction in the molecular weight of monomers used, which may increase the diffusibility of the ink composition into the atmosphere at lower temperatures. The ink composition is thus also required to have safety in terms of both fire defense (the flash point) and health (e.g., skin irritation).

Photocurable ink compositions for inkjet printing that can meet these requirements have been proposed.

Such photocurable ink compositions for inkjet printing include: a photocurable ink composition for inkjet printing which contains a pigment, benzyl acrylate, N-vinylcaprolactam, an acrylated amine compound containing two photopolymerizable functional groups and two amino groups in each molecule, a photoinitiator, and a sensitizer and has a flash point of 70° C. or higher (for example, see Patent Literature 3); a photocurable ink composition for inkjet printing which contains a pigment, a compound containing a (meth)acrylate group and a vinyl ether group in each molecule, a (meth)acrylated amine compound, a hindered amine compound other than (meth)acrylated amine compounds, and a photoinitiator (for example, see Patent Literature 4); a photocurable ink composition for inkjet printing which contains a pigment, a compound containing a (meth)acrylate group and a vinyl ether group in each molecule, and N-vinylcaprolactam (for example, see Patent Literature 5); and an ultraviolet curable ink composition for inkjet printing which contains a compound containing a (meth)acrylate group and a vinyl ether group in each molecule as a photopolymerizable compound and an acylphosphine oxide compound and a thioxanthone compound as photoinitiators (for example, see Patent Literature 6).

Energy saving has been promoted in various fields in recent years. In inkjet printer fields, ink jet heads driven with less energy have been developed. Further, a method of increasing the drive frequency of an ink jet head to achieve high speed printing is being developed. In order to provide a high definition recorded image without grain, an ink jet head that ejects many fine droplets is being developed.

The required properties of an ink composition for inkjet printing to use such ink jet printers include low viscosity. In an inkjet recording method, an ink composition for inkjet printing fills a nozzle and is ejected out of the nozzle by the internal pressure of the ink jet head. The time to completion of filling the nozzle with the ink composition is directly linked to the printing speed. The amount of the internal pressure required for ejection is directly linked to the driving energy.

The viscosity of an ink composition for inkjet printing greatly influences the time required for filling the nozzle and the amount of the internal pressure required. Low viscosity of an ink composition for inkjet printing results in both a short filling time and a low internal pressure. Moreover, low viscosity of an ink composition is very important for a finer nozzle, which requires longer filling time.

The photocurable ink compositions for inkjet printing of Patent Literatures 3 to 6 have relatively high viscosity, and thus they do not meet the above requirements. Although warming or heating these photocurable ink compositions for inkjet printing can reduce the viscosity without sacrificing the ink properties, such a warming or heating operation requires extra energy and damages the ink jet head.

Additionally, since the photocurable ink compositions for inkjet printing of Patent Literatures 3 to 6 contain a thioxanthone compound as a photoinitiator, curing them with low energy LED light results in yellowing of a printed material. If an amino group-containing photopolymerizable compound (e.g., N-vinylcaprolactam) as a photopolymerizable compound is used in addition to the thioxanthone compound, a printed material yellows and then fades, thus losing color balance.

CITATION LIST

Patent Literature

Patent Literature 1: JP 2004-067991 A
Patent Literature 2: JP 2006-169419 A
Patent Literature 3: WO 2010/143738
Patent Literature 4: JP 2012-092291 A
Patent Literature 5: JP 2012-116934 A
Patent Literature 6: JP 2012-140583 A

SUMMARY OF INVENTION

Technical Problem

An object of the present invention is to provide an ink set and a printed material obtained using the ink set. Specifically, the ink set includes photocurable inks for inkjet printing which have excellent curability under LED light and provide a printed material without coloration or fading due to a photoinitiator. The photocurable inks also prevent color mixing in image formation, have good adhesion to polyvinyl chloride-based sheets, and sufficiently prevent cockling. The photocurable inks further have very low viscosity as well as a high flash point and low skin irritation.

Solution to Problem

The present inventors have made intensive studies to solve the above problems and have found out the following. The problems can be solved by selecting photocurable compounds from vinyloxyethoxyethyl acrylate, benzyl acrylate, and N-vinylcaprolactam and selecting photoinitiators from acylphosphine oxide and thioxanthone photoinitiators according to the hue of the ink compositions as the photocurable inks for inkjet printing of the ink set. Thus, the inventors have completed the present invention.

The present invention directs to an ink set including: at least two photocurable ink compositions for inkjet printing selected from the group consisting of a yellow ink composition, a magenta ink composition, a cyan ink composition, a black ink composition, a white ink composition, and a clear ink composition. The photocurable ink compositions for inkjet printing each independently have a flash point of 70° C. or higher as measured using a SETA closed-cup flash point tester in accordance with JIS K 2265 and a viscosity at 25° C. of 5 mPa·s or less. The yellow ink composition, the magenta ink composition, the cyan ink composition, the black ink composition, and the white ink composition each independently contain at least a pigment, photopolymerizable compounds, and a photopolymerization initiator. The clear ink composition contains at least photopolymerizable compounds and a photopolymerization initiator. The magenta ink composition, the cyan ink composition, and the clear ink composition each independently contain vinyloxyethoxyethyl acrylate in an amount of 4 to 40% by mass, benzyl acrylate in an amount of 10 to 65% by mass, and N-vinylcaprolactam in an amount of 5 to 35% by mass as the photopolymerizable compounds. The magenta ink composition, the cyan ink composition, and the clear ink composition each independently contain an acylphosphine oxide photopolymerization initiator as the photopolymerization initiator and are each free of a thioxanthone photopolymerization initiator. The yellow ink composition contains vinyloxyethoxyethyl acrylate in an amount of 4 to 40% by mass, benzyl acrylate in an amount of 10 to 65% by mass, and N-vinylcaprolactam in an amount of 5 to 35% by mass as the photopolymerizable compounds. The yellow ink composition contains an acylphosphine oxide photopolymerization initiator as the photopolymerization initiator. The black ink composition contains vinyloxyethoxyethyl acrylate in an amount of 4 to 40% by mass, benzyl acrylate in an amount of 10 to 65% by mass, and N-vinylcaprolactam in an amount of 5 to 35% by mass as the photopolymerizable compounds. The black ink composition contains a thioxanthone photopolymerization initiator and an acylphosphine oxide photopolymerization initiator as the photopolymerization initiator. The white ink composition contains vinyloxyethoxyethyl acrylate in an amount of 4 to 40% by mass and benzyl acrylate in an amount of 10 to 65% by mass as the photopolymerizable compounds. The white ink composition contains an acylphosphine oxide photopolymerization initiator as the photopolymerization initiator and is free of a thioxanthone photopolymerization initiator.

Preferably, the total amount of monofunctional monomers as photopolymerizable compounds in each of the ink compositions is 45% by mass or more.

The present invention also directs to a printed material obtainable by printing on a polyvinyl chloride-based sheet using the ink set of the present invention.

The present invention is described in detail below.

The ink set of the present invention includes at least two photocurable ink compositions for inkjet printing (hereinafter, also referred to simply as "ink compositions") selected from the group consisting of a yellow ink composition, a magenta ink composition, a cyan ink composition, a black ink composition, a white ink composition, and a clear ink composition. Hereinafter, the description of the "ink compositions" is common to all of the yellow ink composition, the magenta ink composition, the cyan ink composition, the black ink composition, the white ink composition, and the clear ink composition, if not otherwise specified.

Each ink composition of the ink set of the present invention has a flash point of 70° C. or higher as measured using a SETA closed-cup flash point tester in accordance with JIS K 2265 and a viscosity (25° C.) of 5 mPa·s or less.

If the ink composition has a flash point of 70° C. or higher, the ink corresponds to a Category 4 flammable liquid as defined in Globally Harmonized System (GHS) of Classification and Labeling of Chemicals. Such an ink is excellent in safety in terms of low flammability, for example.

If the ink composition has a viscosity of 5 mPa·s or less at 25° C., the following advantage can be provided. The ink has good ejection stability at normal temperature (25° C.) even if used in an ink jet head compatible with energy saving printing or high-speed and high-definition printing. Here, the viscosity of the ink compositions is determined using an E-type viscometer (trade name: RE100L viscometer, from Toki Sangyo Co., Ltd.) under the conditions of 25° C. and 50 rpm.

Each ink composition of the ink set of the present invention contains at least photopolymerizable compounds and a photoinitiator as described below. Specifically, the photopolymerizable compounds contain vinyloxyethoxyethyl acrylate and benzyl acrylate as main components. The photoinitiator contains an acylphosphine oxide photoinitiator as a main component. Further, N-vinylcaprolactam as a photopolymerizable compound may be used, and also a thioxanthone photoinitiator as a photoinitiator may be used, depending on the kind of pigment contained in the ink composition (that is, the hue of the ink composition). With such features, the ink set of the present invention has excellent curability under LED light, provides a printed material without coloration or fading due to a photoinitiator. The ink set also prevents color mixing in image formation, has good adhesion to polyvinyl chloride-based sheets, and sufficiently prevents cockling. The ink set further has very low viscosity as well as a high flash point and low skin irritation.

The ink compositions constituting the ink set of the present invention are described in detail below.

(Pigment)

The ink compositions of the ink set of the present invention other than the clear ink composition each contain a pigment.

The pigment may be any pigment that is traditionally used in photocurable ink compositions for inkjet printing. The pigment is preferably an organic or inorganic pigment that can well disperse (can remain finely dispersed for a long period of time) in the resultant photocurable ink composition for inkjet printing and has excellent light resistance.

Examples of the organic pigment include dye lake pigments, azo pigments, benzimidazolone pigments, phthalocyanine pigments, quinacridone pigments, anthraquinone pigments, dioxazine pigments, indigo pigments, thioindigo pigments, perylene pigments, perynone pigments, diketopyrrolopyrrole pigments, isoindolinone pigments, nitro pigments, nitroso pigments, anthraquinone pigments, flavanthrone pigments, quinophthalone pigments, pyranthrone pigments, and indanthrone pigments. Examples of the inorganic pigment include carbon black, titanium oxide, red oxide, graphite, iron black, chromic oxide green, and aluminum hydroxide.

The following gives examples of pigments for the hue of each ink composition. The yellow ink composition may contain a yellow pigment. The magenta ink composition may contain a magenta pigment. The cyan ink composition may contain a cyan pigment. The black ink composition may contain a black pigment. The white ink composition may contain a white pigment.

Specific examples of these color pigments include the following pigments.

Examples of the yellow pigment include C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213. Preferred examples thereof include C. I. Pigment Yellow 150, 155, and 180.

Examples of the magenta pigment include C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270 and C. I. Pigment Violet 19. Preferred examples thereof include C. I. Pigment Red 122, 202 and Pigment Violet 19.

Examples of the cyan pigment include C. I. Pigment Blue 1, 2, 3, 15, 15:1, 15:2, 15:3, 15:4, 15:6, 16, 18, 22, 27, 29, and 60. Preferred examples thereof include C. I. Pigment Blue 15:4.

Examples of the black pigment include carbon black (C. I. Pigment Black 7).

Examples of the white pigment include titanium oxide and aluminum oxide. Preferred examples thereof include titanium oxide that is surface-treated with such materials as alumina or silica.

The amount of the pigment in each ink composition is preferably 1 to 20% by mass based on the total amount of the ink composition. If the amount of the pigment is less than 1% by mass, the resultant printed material tends to have low image quality. If the amount of the pigment is more than 20% by mass, the pigment tends to adversely affect the viscosity properties of the ink composition.

(Photopolymerizable Compound)

Each ink composition contains photopolymerizable compounds.

Specifically, each ink composition contains vinyloxyethoxyethyl acrylate and benzyl acrylate as the photopolymerizable compounds. The yellow ink composition, the magenta ink composition, the cyan ink composition, the black ink composition, and the clear ink composition each further contain N-vinylcaprolactam.

Each ink composition contains the vinyloxyethoxyethyl acrylate in an amount of 4 to 40% by mass based on the total amount of the ink composition. If the amount of the vinyloxyethoxyethyl acrylate is less than 4% by mass, a printed material produced using the ink composition may have low solvent resistance to solvents such as isopropyl alcohol (IPA). If the amount of the vinyloxyethoxyethyl acrylate is more than 40% by mass, the ink composition may have low adhesion to polyvinyl chloride resin sheets. The amount of the vinyloxyethoxyethyl acrylate is preferably in the range of 15 to 40% by mass.

Each ink composition contains the benzyl acrylate in an amount of 10 to 65% by mass based on the total amount of the ink composition. If the amount of the benzyl acrylate is less than 10% by mass, the ink composition may have low adhesion to polyvinyl chloride resin sheets. If the amount of the benzyl acrylate is more than 65% by mass, the resultant printed material may have low solvent resistance to solvents such as isopropyl alcohol (IPA). The amount of the benzyl acrylate is preferably in the range of 20 to 55% by mass.

In the present invention, the amount of N-vinylcaprolactam in each of the yellow ink composition, the magenta ink composition, the cyan ink composition, the black ink composition, and the clear ink composition is 5 to 35% by mass based on the total amount of the ink composition. If the amount of the N-vinylcaprolactam is less than 5% by mass, the ink composition may have low adhesion to polyvinyl chloride sheets. If the amount of the N-vinylcaprolactam is more than 35% by mass, the ink composition may have lower curability. The lower limit of the amount of the N-vinylcaprolactam is preferably 10% by mass. The upper limit thereof is preferably 30% by mass. If white ink is used, it is preferred that N-vinylcaprolactam is not used because it decreases the stability of the ink.

In the present invention, the yellow ink composition, the magenta ink composition, the cyan ink composition, the black ink composition, and the white ink composition, which contain a pigment, preferably each further contain isobornyl acrylate as a photopolymerizable compound to improve the dispersion stability of the pigment.

The amount of the isobornyl acrylate in each of these ink compositions is preferably 5 to 30% by mass based on the total amount of the ink composition. If the amount of the isobornyl acrylate is less than 5% by mass, the isobornyl acrylate would not have the effect of improving the dispersibility of the pigment. In addition, the effect of lowering tackiness may be reduced if the ink composition exhibits strong tackiness. If the amount of the isobornyl acrylate is more than 30% by mass, the ink composition may have lower adhesion to polyvinyl chloride sheets. The lower limit of the amount of the isobornyl acrylate is more preferably 10% by mass. The upper limit thereof is more preferably 20% by mass.

In the present invention, each ink composition may further contain a monofunctional monomer that has a viscosity at 25° C. of 5 mPa·s or less as a photopolymerizable compound to the extent that it does not lower the flash point of the ink composition below 70° C. Examples of such a monofunctional monomer include 2-methoxyethyl acrylate, isobutyl acrylate, isooctyl acrylate, isodecyl acrylate, and octyl/decyl acrylate. These monofunctional monomers may be used singly, or in combination of two or more thereof as necessary.

From the viewpoint of the viscosity, the flash point, and the adhesion to the polyvinyl chloride resin sheets of the ink compositions, and the solvent resistance of a printed material, the photopolymerizable compounds contain vinyloxyethoxyethyl acrylate and the monofunctional monomers. Preferably, the total amount of monofunctional monomers as photopolymerizable compounds in each ink composition is 45% by mass or more based on the total amount of the ink composition.

As described above, each ink composition contains vinyloxyethoxyethyl acrylate and benzyl acrylate as photopolymerizable compounds in specific amounts. Such photopolymerizable compounds containing vinyloxyethoxyethyl acrylate and a monofunctional monomer allows the ink composition to have excellent curability under LED light and good adhesion to polyvinyl chloride-based sheets such as tarpaulin sheets and vinyl chloride resin sheets, and sufficiently prevent cockling. Further, such photopolymerizable compounds enable design of an ink composition having a viscosity as low as 5 mPa·s or less without sacrificing a high flash point and low skin irritation. The ink set of the present invention, which includes at least two of these ink compositions, has good ejection stability from an ink jet head compatible with energy saving or high-speed and high-definition printing at normal temperature.

In the present invention, a photopolymerizable compound other than those described above may be further used as a photopolymerizable compound constituting the ink composition in an amount that does not lower the properties of ink composition. In particular, the amount of the photopolymerizable compound other than those described above is an amount that does not lower the flash point below 70° C., allow the viscosity at 25° C. to exceed 5 mPa·s, or lower the adhesion to polyvinyl chloride sheets.

Examples of photopolymerizable compounds other than those described above include compounds that contain an ethylenic double bond. Such an ethylenic double bond-containing compound is not limited, and may be a monofunctional monomer, a polyfunctional monomer, a prepolymer, or an oligomer.

Specific examples of photopolymerizable compounds other than those described above include ethylene glycol di(meth)acrylate, diethylene glycol di(meth)acrylate, polyethylene glycol di(meth)acrylate, 1,6-hexanediol di(meth)acrylate, ethoxylated 1,6-hexanediol di(meth)acrylate, neopentyl glycol di(meth)acrylate, ethoxylated neopentyl glycol di(meth)acrylate, propoxylated neopentyl glycol di(meth)acrylate, tripropylene glycol di(meth)acrylate, polypropylene glycol di(meth)acrylate, 1,4-butanediol di(meth)acrylate, 1,9-nonanediol di(meth)acrylate, tetraethylene glycol di(meth)acrylate, 2-n-butyl-2-ethyl-1,3-propanediol di(meth)acrylate, dimethylol tricyclodecane di(meth)acrylate, hydroxypivalic acid neopentyl glycol di(meth)acrylate, 1,3-butyleneglycol di(meth)acrylate, ethoxylated bisphenol A di(meth)acrylate, propoxylated bisphenol A di(meth)acrylate, cyclohexane dimethanol di(meth)acrylate, dimethylol dicyclopentane di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, tetramethylolpropane tri(meth)acrylate, tetramethylolmethane tri(meth)acrylate, pentaerythritol tetra(meth)acrylate, ethylene oxide-modified pentaerythritol tetra(meth)acrylate, caprolactone-modified trimethylolpropane tri(meth)acrylate, ethoxylated isocyanuric acid tri(meth)acrylate, tri(2-hydroxyethylisocyanurate) tri(meth)acrylate, propoxylated glyceryl tri(meth)acrylate, tetramethylolmethane tetra(meth)acrylate, ditrimethylolpropane tetra(meth)acrylate, ethoxylated pentaerythritol tetra(meth)acrylate, dipentaerythritol hexa(meth)acrylate, neopentyl glycol oligo(meth)acrylate, 1,4-butanediol oligo(meth)acrylate, 1,6-hexanediol oligo(meth)acrylate, trimethylolpropane oligo(meth)acrylate, pentaerythritol oligo(meth)acrylate, urethane(meth)acrylate, epoxy(meth) acrylate, polyester(meth)acrylate, 2-phenoxyethyl(meth)acrylate, (meth)acryloylmorpholine, 2-hydroxyethyl(meth)acrylate, 2-hydroxypropyl(meth)acrylate, 4-hydroxybutyl(meth)acrylate, isobutyl(meth)acrylate, t-butyl(meth)acrylate, isooctyl(meth)acrylate, cyclohexyl(meth)acrylate, methoxy triethylene glycol(meth)acrylate, 3-methoxybutyl(meth)acrylate, ethoxyethoxyethyl(meth)acrylate, butoxyethyl(meth)acrylate, ethoxy diethylene glycol(meth)acrylate, methoxy dipropylene glycol(meth)acrylate, methylphenoxyethyl(meth)acrylate, dipropylene glycol (meth)acrylate, and ethylene oxide (EO) or propylene oxide (PO) modification products thereof. These photopolymerizable compounds may be used singly, or in combination of two or more thereof. Among these compounds, those that have low odor and low skin irritation are preferred in terms of safety. The term "(meth)acrylate" herein means acrylate and methacrylate.

(Photoinitiator)

In the present invention, each ink composition contains an acylphosphine oxide photoinitiator as a photoinitiator. In addition to the acylphosphine oxide photoinitiator, a thioxanthone photoinitiator may be used depending on the hue of the ink composition.

The acylphosphine oxide photoinitiator has the property of absorbing light over a wavelength range of 450 to 300 nm. The acylphosphine oxide exhibits initiator function for curing reaction (radical polymerization) when irradiated with light having a wavelength within the above range. Use of such a photoinitiator allows the ink composition constituting the ink set of the present invention to have curability under light that can be efficiently applied using a LED lamp.

The thioxanthone photoinitiator has the property of absorbing light at a wavelength range of 400 nm or longer, mainly in the ultraviolet light wavelength range. The thioxanthone photoinitiator exhibits sensitizer function for curing reaction when irradiated with light having a wavelength of 400 nm or longer. Use of such a photoinitiator can promote the curability of the ink composition under light that can be efficiently applied using a LED lamp.

The thioxanthone photoinitiator, however, tends to cause yellowing of the photopolymerizable compounds. Use of the thioxanthone photoinitiator thus makes the hue of the ink composition yellowish as compared with the color (natural hue) derived from the pigment. If N-vinylcaprolactam is used as a photopolymerizable compound in addition to the thioxanthone photoinitiator, the ink composition tends to yellow and then fade over time. In this case, the yellow tint fades over time.

Accordingly, the magenta ink composition, the cyan ink composition, the white ink composition, and the clear ink composition, which are susceptible to such changes in color, contain the acylphosphine oxide photoinitiator as a photoinitiator, but are free of the thioxanthone photoinitiator.

The yellow ink composition, which is originally yellow in hue, is hardly susceptible to the change in the yellow tint. The yellow ink composition thus may or may not contain the thioxanthone photoinitiator as a photoinitiator in addition to the acylphosphine oxide photoinitiator.

The hue of the black ink composition is unsusceptible to the changes in color or fading described above. In addition, the black ink composition has lower photopolymerizability than ink compositions of other hues. The black ink composition therefore contains both the acylphosphine oxide photoinitiator and the thioxanthone photoinitiator as photoinitiators to improve the reactivity.

Specific examples of the acylphosphine oxide photoinitiator include 2,4,6-trimethylbenzoyl-diphenyl-phosphine oxide (trade name: TPO, from Lamberti) and bis(2,4,6-trimethylbenzoyl)-phenylphosphine oxide (trade name: IRGACURE819, from Ciba Specialty Chemicals). These initiators can be used singly, or in combination of two or more thereof.

Specific examples of the thioxanthone photoinitiator include 2,4-diethylthioxanthone, 2-isopropylthioxanthone, 4-isopropylthioxanthone, and chloro-4-propoxythioxanthone, such as DETX, ITX, and CPTX (from LAMBSON).

In the present invention, the amount of the acylphosphine oxide photoinitiator is preferably 3 to 20% by mass based on the total amount of the ink composition. If the amount of the acylphosphine oxide photoinitiator is less than 3% by mass, the initiator function may be insufficient under some irradiation conditions of LED light. If the amount of the acylphosphine oxide photoinitiator is more than 20% by mass, the effects as a photoinitiator are not improved, and the amount of the initiator added is undesirably in excess. The amount of the acylphosphine oxide photoinitiator is more preferably 3 to 13% by mass.

The amount of the thioxanthone photoinitiator is preferably in the range of 0.5 to 6% by mass based on the total amount of the ink composition. If the amount of the thioxanthone photoinitiator is less than 0.5% by mass, the initiator function may be insufficient under some irradiation conditions of LED light. If the amount of the thioxanthone photoinitiator is more than 6% by mass, the effects as a photoinitiator are not improved, and the amount of the initiator added is undesirably in excess.

The photocurable ink compositions for inkjet printing according to the present invention may contain other known photoinitiators or sensitizers in addition to the above photoinitiators.

(Pigment Dispersant)

In the present invention, the ink compositions containing a pigment may contain a pigment dispersant to disperse the pigment.

The pigment dispersant more finely disperses the pigment in a step of dispersing pigment. It also improves storage stability of the photocurable ink composition for inkjet printing by preventing coagulation or precipitation of the pigment.

The pigment dispersant may be any conventionally used pigment dispersant, and is preferably a polymeric dispersant. Examples of the pigment dispersant include carbodiimide dispersants, polyesteramine dispersants, aliphatic amine dispersants, modified polyacrylate dispersant, modified polyurethane dispersants, multi-chain polymeric nonionic dispersants, and polymeric ion activators. These pigment dispersants may be used singly, or two or more of these may be used in admixture.

The amount of the pigment dispersant is preferably 1 to 200 parts by mass based on 100 parts by mass of all the pigments used. If the amount of the pigment dispersant is less than 1 part by mass, the pigment dispersant may be less effective for finely dispersing the pigment or maintaining storage stability of the resultant photocurable ink composition for inkjet printing depending on the type of the pigment or the dispersant. Although the amount of the pigment dispersant may be more than 200 parts by mass, use of the pigment dispersant in an amount of more than 200 parts by mass may generate no difference in the above effects. The lower limit of the amount of the pigment dispersant is preferably 5 parts by mass, whereas the upper limit thereof is more preferably 60 parts by mass.

(Additives)

The ink compositions of the present invention may contain additives to have various properties depending on the needs. Specific example of additives include photostabilizers, surface treating agents, surfactants, viscosity reducers, antioxidants, anti-aging agents, crosslinking promoters, polymerization inhibitors, plasticizers, antiseptics, pH adjusters, anti-foaming agents, and moisturizing agents.

The ink compositions of the present invention are excellent in all aspects of curability under light-emitting diode (LED) light, providing a printed material without coloration or color deterioration due to a photoinitiator, adhesion to vinyl chloride sheets, prevention of cockling, good ejection stability from an ink jet head compatible with energy saving or high-speed and high definition printing, a high flash point, and safety such as low skin irritation and low odor. These effects are obtained by incorporation of the specific photopolymerizable compounds described above in specific amounts and incorporation of the photoinitiator.

The ink set of the present invention includes at least two photocurable ink compositions for inkjet printing selected from the group consisting of the yellow ink composition, the magenta ink composition, the cyan ink composition, the black ink composition, the white ink composition, and the clear ink composition described above. The ink set of the present invention, which includes these photocurable ink compositions for inkjet printing, can provide a printed material in a desired color. The ink set also prevents color mixing, coloration, and color deterioration in production of a printed material, and thus it provides a printed material with almost no color mixing, coloration, or color deterioration.

The combination of the ink compositions constituting the photocurable ink for ink jet printing is not limited to particular combinations. The ink set includes at least two selected from the above ink compositions of six colors, and may contain all of the six ink compositions.

The ink compositions of the present invention can be prepared by any method. For example, the ink compositions each can be prepared by mixing all the above-described materials using a bead mill or a three-roll mill. The ink compositions containing a pigment may be prepared as follows. The pigment, the pigment dispersant, and the photopolymerizable compounds are first mixed to prepare a concentrated base. The concentrated base is then mixed with components such as the photopolymerizable compounds, the photoinitiator, and a sensitizer to achieve a desired composition.

Although a polyvinyl chloride-based sheet such as a tarpaulin sheet or vinyl chloride resin sheet is preferable for the base material on which is printed the photocurable ink compositions for inkjet printing of the present invention, base materials on which photocurable ink compositions for inkjet printing have conventionally been printed (such as paper, plastic film, capsules, gel, metal foil, glass, wood, or cloth) can also be printed without any problems.

A specific method of printing and curing the ink compositions includes ejecting the ink compositions constituting the ink set of the present invention onto a base material using an ink jet head compatible with low viscosity ink to form an ink coating film, followed by curing the coating film by exposing it to light. For example, ejection onto the base material (printing of an image) can be carried out by supplying the ink compositions to a printer head of an inkjet recording printer, and ejecting the ink composition from the printer head onto a base material so that the film thickness of the ink coating film be 1 to 20 μm. Exposure to light and curing (curing of the image) can be carried out by applying light to the ink composition coated onto the base material as an image.

The inkjet recording printer for printing using the ink set of the present invention may be a conventionally used inkjet recording printer. In the case of using a continuous type inkjet recording printer, electrical conductivity is regulated by further adding an electrical conductivity-imparting agent to the photocurable ink compositions.

Examples of the light source for image curing include sources of ultraviolet light, an electron beam, and visible light, and a light-emitting diode (LED). An LED lamp mainly produces longer wavelength, low energy ultraviolet rays. Use of an LED light as a light source thus allows images to be cured without generating ozone. In addition, it requires no large-sized devices and reduces power consumption. For the above reason, light from an LED is preferably an active energy beam having a peak wavelength within the range of 420 to 365 nm. A printed material obtained in this manner using the ink set of the present invention is also one aspect of the present invention.

The printed material of the present invention is obtainable by printing the ink compositions constituting the ink set of the present invention onto a polyvinyl chloride-based sheet and photocuring the ink compositions.

In production of the printed material of the present invention, the ink compositions are printed to form an ink coating film having a film thickness of 1 to 20 μm. Radical polymerization of the photopolymerizable compounds on the surface of the ink coating film is likely to be inhibited by oxygen in the atmosphere (oxygen inhibition). If the ink coating film has a film thickness of less than 1 μm, the film is more likely to be affected by the oxygen inhibition. In the case of the ink compositions with deep color pigments, light significantly attenuates when it passes through the ink coating film. Therefore, if the film thickness is greater than 20 μm, the internal (in particular, bottom) curability tends to be low.

Although the ink compositions of the ink set of the present invention have photocurability, the ink compositions are not necessarily required to be cured with light. For example, electron rays may be used instead. Electron rays have significantly high ability to cause radical polymerization. Use of electron rays allows the entire coating film to have high curability even if the coating film containing a deep color pigment in a large amount.

Advantageous Effects of Invention

The ink set of the present invention, which has the above-described features, has excellent curability under LED light, provides a printed material without coloration or fading due to a photoinitiator. The ink set also prevents color mixing in image formation, has good adhesion to polyvinyl chloride-based sheets, and sufficiently prevent cockling. The ink set further has very low viscosity as well as a high flash point and low skin irritation.

DESCRIPTION OF EMBODIMENTS

The present invention is further described in detail below referring to examples. The present invention is not limited to the examples. The term "%" refers to "% by mass" and the term "parts" refers to "parts by mass" unless specifically indicated otherwise.

The materials used in the examples and comparative example are listed below.

<Pigment Dispersant>
Ajisper (registered trade mark) PB821 (from Ajinomoto Co., Inc.)
Solsperse 56000 (from Lubrizol Inc.)
<Photopolymerizable Compound>
VEEA: vinyloxyethoxyethyl acrylate (from Nippon Shokubai Co., Ltd.)
V#160: benzyl acrylate (from Osaka Organic Chemical Industry Co., Ltd)
V-CAP: N-vinylcaprolactam (from ISP Japan Ltd.)
IBXA: isobornyl acrylate (from Osaka Organic Chemical Industry Co., Ltd)
CN371: (reactive amine coinitiator, from SARTOMER, amine value: 137, containing two amino groups and two acryloyl groups)
HDDA: 1,6-hexanediol diacrylate (from Daicel-Cytec Company, Ltd.)
<Photoinitiator>
TPO: 2,4,6-trimethylbenzoyl diphenyl phosphine oxide (from LAMBERTI)
DETX: 2,4-diethylthioxanthone (from Lambson)
ITX: 2-isopropylthioxanthone (from Lambson)
CPTX: chloro-4-propoxythioxanthone (from Lambson)
<Additives>
BYK-315 (silicone additive, from BYK Chemie)

Examples 1 to 17 and Comparative Examples 1 to 18

<Preparation of Photocurable Ink for Ink jet Printing>
<Black Ink Composition>

A pigment (Pigment Black 7), a pigment dispersant (Ajisper PB821), and a photopolymerizable compound (IBXA) were mixed to a mixing ratio (mass ratio) of 20/8/72. The mixture was dispersed using an Eiger mill (zirconia beads with a diameter of 0.5 mm were used as media) to produce a concentrated base.

The concentrated base was mixed with each component according to the compositions (% by mass) listed in Table 1. Thus, black ink compositions according to Examples 1 to 6 and Comparative Examples 1, 6, 12, and 18 were obtained.
<Yellow Ink Composition>

A pigment (Pigment Yellow 150), a pigment dispersant (Solsperse 56000, from Lubrizol Inc.), and a photopolymerizable compound (IBXA) were mixed to a mixing ratio (mass ratio) of 16/6.4/77.6. The mixture was dispersed using an Eiger mill (zirconia beads with a diameter of 0.5 mm were used as media) to produce a concentrated base.

The concentrated base was mixed with each component according to the compositions (% by mass) listed in Table 1. Thus, yellow ink compositions according to Examples 7 to 9 and Comparative Examples 7 and 13 were obtained.
<Cyan Ink Composition>

A pigment (Pigment Blue 15:4), a pigment dispersant (Solsperse 56000, from Lubrizol Inc.), and a photopolymerizable compound (IBXA) were mixed to a mixing ratio (mass ratio) of 20/8/72. The mixture was dispersed using an Eiger mill (zirconia beads with a diameter of 0.5 mm were used as media) to produce a concentrated base.

The concentrated base was mixed with each component according to the compositions (% by mass) listed in Table 1. Thus, cyan ink compositions according to Examples 10 to 11 and Comparative Examples 2, 8, and 14 were obtained.
<Magenta Ink Composition>

A pigment (Pigment Red 122), a pigment dispersant (Solsperse 56000, from Lubrizol Inc.), and a photopolymerizable compound (IBXA) were mixed to a mixing ratio (mass ratio) of 16/9.6/74.4. The mixture was dispersed using an Eiger mill (zirconia beads with a diameter of 0.5 mm were used as media) to produce a concentrated base.

The concentrated base was mixed with each component according to the compositions (% by mass) listed in Table 1. Thus, magenta ink compositions according to Examples 12 and 13 and Comparative Examples 3, 9, and 15 were obtained.

<White Ink Composition>

Titanium oxide, a pigment dispersant (Ajisper PB821), and a photopolymerizable compound (IBXA) were mixed to a mixing ratio (mass ratio) of 40/4/56. The mixture was dispersed using an Apex mill (zirconia beads with a diameter of 0.5 mm were used as media) to produce a concentrated base.

The concentrated base was mixed with each component according to the compositions (% by mass) listed in Table 1. Thus, white ink compositions according to Examples 14 and 15 and Comparative Examples 4, 10, and 16 were obtained.

<Clear Ink Composition>

Components were mixed according to the compositions (% by mass) listed in Table 1. Thus, clear ink compositions according to Examples 16 and 17 and Comparative Examples 5, 11, and 17 were obtained.

TABLE 1

| | Examples | | | | | | | | |
|---|---|---|---|---|---|---|---|---|---|
| | Black | | | | | | Yellow | | |
| Composition | 1 | 2 | 3 | 4 | 5 | 6 | 7 | 8 | 9 |
| Black concentrated base | 8 | 8 | 8 | 8 | 8 | 8 | — | — | — |
| Yellow concentrated base | — | — | — | — | — | — | 15 | 15 | 15 |
| Cyan concentrated base | — | — | — | — | — | — | — | — | — |
| Magenta concentrated base | — | — | — | — | — | — | — | — | — |
| White concentrated base | — | — | — | — | — | — | — | — | — |
| V-CAP | 15.5 | 15.5 | 15.5 | 15.5 | 15.5 | 15.5 | 15.5 | 15.5 | 15.5 |
| Benzyl acrylate | 60 | 45 | 47 | 25 | 45 | 45 | 42 | 22 | 41.5 |
| Vinyloxyethoxyethyl acrylate | 5 | 20 | 20 | 40 | 20 | 20 | 20 | 40 | 20 |
| Isobornyl acrylate | — | — | — | — | — | — | — | — | — |
| TPO | 7 | 7 | 7 | 7 | 7 | 7 | 7 | 7 | 7 |
| DETX | 4 | 4 | 2 | 4 | — | — | — | — | 0.5 |
| ITX | — | — | — | — | 4 | — | — | — | — |
| CPTX | — | — | — | — | — | 4 | — | — | — |
| BYK315 | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 |

| | Examples | | | | | | | |
|---|---|---|---|---|---|---|---|---|
| | Cyan | | Magenta | | White | | Clear | |
| Composition | 10 | 11 | 12 | 13 | 14 | 15 | 16 | 17 |
| Black concentrated base | — | — | — | — | — | — | — | — |
| Yellow concentrated base | — | — | — | — | — | — | — | — |
| Cyan concentrated base | 8 | 8 | — | — | — | — | — | — |
| Magenta concentrated base | — | — | 15 | 15 | — | — | — | — |
| White concentrated base | — | — | — | — | 32 | 32 | — | — |
| V-CAP | 15.5 | 15.5 | 15.5 | 15.5 | — | — | 14.5 | 14.5 |
| Benzyl acrylate | 49 | 29 | 42 | 22 | 40.5 | 20.5 | 47 | 27 |
| Vinyloxyethoxyethyl acrylate | 20 | 40 | 20 | 40 | 20 | 40 | 20 | 40 |
| Isobornyl acrylate | — | — | — | — | — | — | 10 | 10 |
| TPO | 7 | 7 | 7 | 7 | 7 | 7 | 8 | 8 |
| DETX | — | — | — | — | — | — | — | — |
| ITX | — | — | — | — | — | — | — | — |
| CPTX | — | — | — | — | — | — | — | — |
| BYK315 | 0.5 | 0.5 | 0.5 | 0.5 | 0.5 | 0.5 | 0.5 | 0.5 |
| Total | 100 | 100 | 100 | 100 | 100 | 100 | 100 | 100 |

| | Comparative Examples | | | | | | | | | |
|---|---|---|---|---|---|---|---|---|---|---|
| Composition | Black 1 | Cyan 2 | Magenta 3 | White 4 | Clear 5 | Black 6 | Yellow 7 | Cyan 8 | Magenta 9 | White 10 |
| Black concentrated base | 8 | — | — | — | — | 8 | — | — | — | — |
| Yellow concentrated base | — | — | — | — | — | — | 15 | — | — | — |
| Cyan concentrated base | — | 8 | — | — | — | — | — | 8 | — | — |
| Magenta concentrated base | — | — | 15 | — | — | — | — | — | 15 | — |
| White concentrated base | — | — | — | 32 | — | — | — | — | — | 32 |
| V-CAP | 15.5 | 15.5 | 15.5 | — | 14.5 | 15.5 | 15.5 | 15.5 | 15.5 | — |
| Benzyl acrylate | 46 | 49 | 42 | 40.5 | 47 | 8 | 8 | 8 | 8 | 8 |
| Vinyloxyethoxyethyl acrylate | 20 | 20 | 20 | 20 | 20 | 57 | 54 | 61 | 54 | 52.5 |
| Isobornyl acrylate | — | — | — | — | 10 | — | — | — | — | — |
| CN371 | — | — | — | — | — | — | — | — | — | — |
| HDDA | — | — | — | — | — | — | — | — | — | — |
| 2-Methoxyethyl acrylate | — | — | — | — | — | — | — | — | — | — |
| TPO | 10 | 5 | 5 | 5 | 6 | 7 | 7 | 7 | 7 | 7 |

TABLE 1-continued

| | | | | | | | | | | |
|---|---|---|---|---|---|---|---|---|---|---|
| DETX | — | 2 | 2 | 2 | 2 | 4 | — | — | — | — |
| ITX | — | — | — | — | — | — | — | — | — | — |
| CPTX | — | — | — | — | — | — | — | — | — | — |
| BYK315 | 0.5 | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 | 100 |

| | Comparative Examples | | | | | | | |
|---|---|---|---|---|---|---|---|---|
| Composition | Clear 11 | Black 12 | Yellow 13 | Cyan 14 | Magenta 15 | White 16 | Clear 17 | Black 18 |
| Black concentrated base | — | 8 | — | — | — | — | — | 8 |
| Yellow concentrated base | — | — | 15 | — | — | — | — | — |
| Cyan concentrated base | — | — | — | 8 | — | — | — | — |
| Magenta concentrated base | — | — | — | — | 15 | — | — | — |
| White concentrated base | — | — | — | — | — | 32 | — | — |
| V-CAP | 14.5 | 15.5 | 15.5 | 15.5 | 15.5 | — | 14.5 | 15.5 |
| Benzyl acrylate | 8 | 62 | 59 | 66 | 59 | 57.5 | 66 | 9 |
| Vinyloxyethoxyethyl acrylate | 59 | 3 | 3 | 3 | 3 | 3 | 3 | — |
| Isobornyl acrylate | 10 | — | — | — | — | — | 8 | — |
| CN371 | — | — | — | — | — | — | — | 9 |
| HDDA | — | — | — | — | — | — | — | 10 |
| 2-Methoxyethyl acrylate | — | — | — | — | — | — | — | 41 |
| TPO | 8 | 7 | 7 | 7 | 7 | 7 | 8 | 7 |
| DETX | — | 4 | — | — | — | — | — | — |
| ITX | — | — | — | — | — | — | — | — |
| CPTX | — | — | — | — | — | — | — | — |
| BYK315 | 0.5 | 0.5 | 0.5 | 0.5 | 0.5 | 0.5 | 0.5 | 0.5 |
| Total | 100 | 100 | 100 | 100 | 100 | 100 | 100 | 100 |

[Determination of Viscosity of Ink Composition]

The viscosity of the ink compositions prepared in Examples 1 to 17 and Comparative Examples 1 to 18 was determined using an E-type viscometer (trade name: RE100L viscometer, from Toki Sangyo Co., Ltd.) under the conditions of a temperature of 25° C. and 50 rpm. The results are shown in Table 2.

[Determination of Flash Point of Ink Composition]

The flash point of the ink compositions prepared in Examples 1 to 17 and Comparative Examples 1 to 18 was determined while holding the compositions at a constant temperature with an aluminum block and using a SETA closed-cup flash point tester in accordance with JIS K 2265. The results are shown in Table 2.

[Property Evaluation of Ink Composition]

The ink compositions for inkjet printing obtained in Examples 1 to 17 and Comparative Examples 1 to 18 were coated onto a polyvinyl chloride sheet (Flontlit Grossy 120 g, from Cooley) using a #4 bar coater. Next, the coated ink compositions were cured using a Z-8 lamp available from Heraeus (mercury lamp) or LED lamp available from Phoseon Technology.

The cured ink compositions were then evaluated for curability under the Z-8 lamp, curability under the LED lamp, adhesion, solvent resistance, prevention of cockling, and changes in color of the cured coating film according to the methods described below. The results are shown in Table 2.

(Curing Under Z-8 Lamp)

The curability was evaluated using a Z-8 lamp (mercury lamp) available from Heraeus based on the cumulative amount (30 mJ/cm$^2$) of irradiation energy until surface tackiness was no longer observed. Specifically, the irradiation was performed under irradiation conditions of an output of 60 W, a distance between the lamp and the ink-coated surface of 13 cm, and a speed of passing the lamp over the ink-coated surface of 23 m/min (cumulative amount of UV light per pass: 30 mJ/cm$^2$).

(Curability Under LED Lamp)

The curability was evaluated using a LED lamp available from Phoseon Technology based on the cumulative amount (30 mJ/cm$^2$) of irradiation energy until surface tackiness was no longer observed. Specifically, the irradiation was performed under irradiation conditions of a distance between the lamp and the ink-coated surface of 2 cm and an irradiation time per irradiation of 1 second (cumulative amount of UV light per second: 40 mJ/cm$^2$).

(Adhesion)

Coating films of the ink compositions were cured until surface tackiness was eliminated. Crosscuts were made in each cured coating film with a cutter-knife. A piece of cellophane tape was applied to the cut area and then removed by pulling it off. The degree of peeling of the cured coating films was evaluated according to the criteria below.

Good: no peeling of cured coating film was observed

Fair: peeling of cured coating film was observed, and the peeled area was less than 20%

Poor: the peeled area was 20% or more (Solvent Resistance)

Cured coating films of the ink compositions were each rubbed with bleached cloth soaked with isopropyl alcohol (IPA) 10 times using a Gakushin-type rubbing tester (from Daiei Kagaku Seiki Mfg. Co., Ltd.) at a load of 500 g. The degree of peeling of the cured coating films was evaluated from the contamination of the bleached cloth and the state of the surface of the cured coating film thus rubbed according to the following criteria.

Good: neither contamination of bleached cloth nor wear damage of cured coating film was observed Fair: contamination of bleached cloth was observed, but no wear damage of cured coating film was observed Poor: both contamination of bleached cloth, and wear damage of cured coating film were observed (Prevention of Cockling)

The ink compositions were each coated onto a polyvinyl chloride sheet (Flontlit Grossy 120 g, from Cooley) using a

12 bar coater, and cured by UV irradiation. Thus, printed materials were obtained. The degree of shrinkage on the back of each printed material was evaluated based on the criteria below.

Good: absence of shrinkage in coated portions in comparison with non-coated portions
Poor: presence of shrinkage in coated portions in comparison with non-coated portions (Change in Color of Cured Coating Film)

The ink compositions prepared in Examples 1 to 17 and Comparative Examples 1 to 18 were each coated onto a polyvinyl chloride sheet (Flontlit Glossy 120 g, from Cooley) using a #4 bar coater. Next, each coated ink composition was fully cured using a LED lamp available from Phoseon Technology under an irradiation condition of 40 mJ/cm$^2$ per second to produce a printed material.

The color (L*a*B*) of the printed material was measured immediately after and one day after the printing using a spectrophotometer Spectro Eye available from X-Rite Inc. The change in color was evaluated from the color difference (ΔE) according to the following criteria.

Good: ΔE was 1 or less
Poor: ΔE was greater than 1

(Ejection Stability of Ink Composition)

An inkjet recording printer provided with inkjet nozzles for low viscosity ink and the ink compositions prepared in Examples 1 to 17 and Comparative Examples 1 to 18 were placed at an ambient temperature of 25° C. for 24 hours, so that the temperature of the inkjet recording printer and the ink compositions was 25° C. Thereafter, each ink composition was continuously printed on a polyvinyl chloride sheet (Flontlit Glossy 120 g, from Cooley) at an ambient temperature of 25° C. The ejection stability was evaluated according to the following criteria.

Good: ink composition was stably ejected without irregularities of printing
Poor: irregularities of printing occurred, or ink composition was not stably ejected (Ink Set)

An inkjet recording printer provided with inkjet nozzles for low viscosity ink and the ink compositions prepared in Examples 1 to 17 and Comparative Examples 1 to 18 were placed at an ambient temperature of 25° C. for 24 hours, so that the temperature of the inkjet recording printer and the ink compositions was 25° C. Thereafter, the ink compositions according to Examples 1 to 17 were charged into the inkjet recording printer according to the combinations listed in Table 3, and continuously printed on a polyvinyl chloride sheet (Flontlit Glossy 120 g, from Cooley) at an ambient temperature of 25° C. The printed ink compositions were cured by LED irradiation. Thus, printed materials with a landscape image were obtained. The ink set was evaluated from bleeding of the printed image. The results are shown in Table 3. The properties of the printed materials were evaluated in accordance with the methods described above.

(Hazard Information)

Hazard information of the ink compositions was determined in accordance with the Globally Harmonized System (GHS) of Classification and Labelling of Chemicals. The results are shown in Table 2.

TABLE 2

| Evaluation items | Examples | | | | | | | | |
|---|---|---|---|---|---|---|---|---|---|
|  | 1 | 2 | 3 | 4 | 5 | 6 | 7 | 8 | 9 |
| Viscosity (mPa · s, 25° C.) | 4.3 | 4.7 | 4.3 | 4.6 | 4.3 | 4.3 | 4.6 | 4.6 | 4.8 |
| Flash point (° C.) | 93 or higher | 93 or higher | 93 or higher | 93 or higher | 93 or higher | 93 or higher | 93 or higher | 93 or higher | 93 or higher |
| Z-8 curability mJ/cm$^2$ (the number of passes) | 30 (1) | 30 (1) | 30 (1) | 30 (1) | 30 (1) | 30 (1) | 30 (1) | 30 (1) | 30 (1) |
| Adhesion | good | good | good | good | good | good | good | good | good |
| Solvent resistance | good | good | good | good | good | good | good | good | good |
| Cockling | good | good | good | good | good | good | good | good | good |
| Ejection stability | good | good | good | good | good | good | good | good | good |
| LED curability mJ/cm$^2$ (the number of irradiations) | 40 (1) | 30 (1) | 30 (1) | 30 (1) | 30 (1) | 30 (1) | 30 (1) | 30 (1) | 30 (1) |
| Adhesion | good | good | good | good | good | good | good | good | good |
| Solvent resistance | good | good | good | good | good | good | good | good | good |
| Cockling | good | good | good | good | good | good | good | good | good |
| Ejection stability | good | good | good | good | good | good | good | good | good |
| Change in color of cured coating film | good | good | good | good | good | good | good | good | good |
| GHS Hazard information | No acute toxicity | No acute toxicity | No acute toxicity | No acute toxicity | No acute toxicity | No acute toxicity | No acute toxicity | No acute toxicity | No acute toxicity |

| Evaluation items | Examples | | | | | | | |
|---|---|---|---|---|---|---|---|---|
|  | 10 | 11 | 12 | 13 | 14 | 15 | 16 | 17 |
| Viscosity (mPa · s, 25° C.) | 4.3 | 4.4 | 4.3 | 4.4 | 5 | 4.9 | 4.3 | 4.4 |
| Flash point (° C.) | 93 or higher | 93 or higher | 93 or higher | 93 or higher | 93 or higher | 93 or higher | 93 or higher | 93 or higher |
| Z-8 curability mJ/cm$^2$ (the number of passes) | 30 (1) | 30 (1) | 30 (1) | 30 (1) | 30 (1) | 30 (1) | 30 (1) | 30 (1) |
| Adhesion | good | good | good | good | good | good | good | good |
| Solvent resistance | good | good | good | good | good | good | good | good |
| Cockling | good | good | good | good | good | good | good | good |
| Ejection stability | good | good | good | good | good | good | good | good |
| LED curability mJ/cm$^2$ (the number of irradiations) | 30 (1) | 30 (1) | 30 (1) | 30 (1) | 30 (1) | 30 (1) | 30 (1) | 30 (1) |

TABLE 2-continued

| | | | | | | | | |
|---|---|---|---|---|---|---|---|---|
| Adhesion | good | good | good | good | good | good | good | good |
| Solvent resistance | good | good | good | good | good | good | good | good |
| Cockling | good | good | good | good | good | good | good | good |
| Ejection stability | good | good | good | good | good | good | good | good |
| Change in color of cured coating film | good | good | good | good | good | good | good | good |
| GHS Hazard information | No acute toxicity | No acute toxicity | No acute toxicity | No acute toxicity | No acute toxicity | No acute toxicity | No acute toxicity | No acute toxicity |

| | Comparative Examples | | | | | | | | | |
|---|---|---|---|---|---|---|---|---|---|---|
| Evaluation items | 1 | 2 | 3 | 4 | 5 | 6 | 7 | 8 | 9 | 10 |
| Viscosity (mPa · s. 25° C.) | 5 | 4.6 | 4.5 | 5 | 4.5 | 4.6 | 4.6 | 4.4 | 4.4 | 4.8 |
| Flash point (° C.) | 93 or higher | lower than 70 | 93 or higher | 93 or higher | 93 or higher | 93 or higher | 93 or higher | 93 or higher | 93 or higher | 93 or higher |
| Z-8 curability mJ/cm$^2$ (the number of passes) | 30 (1) | 30 (1) | 30 (1) | 30 (1) | 30 (1) | 30 (1) | 30 (1) | 30 (1) | 30 (1) | 30 (1) |
| Adhesion | good | good | good | good | good | fair | fair | fair | fair | fair |
| Solvent resistance | good | good | good | good | good | good | good | good | good | good |
| Cockling | good | good | good | good | good | good | good | good | good | good |
| Ejection stability | good | good | good | good | good | good | good | good | good | good |
| LED curability mJ/cm$^2$ (the number of irradiations) | 80 (2) | 30 (1) | 30 (1) | 30 (1) | 30 (1) | 40 (1) | 30 (1) | 30 (1) | 30 (1) | 30 (1) |
| Adhesion | good | good | good | good | good | fair | fair | fair | fair | fair |
| Solvent resistance | good | good | good | good | good | good | good | good | good | good |
| Cockling | good | good | good | good | good | good | good | good | good | good |
| Ejection stability | good | good | good | good | good | good | good | good | good | good |
| Change in color of cured coating film | good | poor | poor | poor | poor | good | good | good | good | good |
| GHS Hazard information | No acute toxicity | Acutely toxic | No acute toxicity | No acute toxicity | No acute toxicity | No acute toxicity | No acute toxicity | No acute toxicity | No acute toxicity | No acute toxicity |

| | | Comparative Examples | | | | | | | |
|---|---|---|---|---|---|---|---|---|---|
| | Evaluation items | 11 | 12 | 13 | 14 | 15 | 16 | 17 | 18 |
| | Viscosity (mPa · s. 25° C.) | 4.3 | 4.3 | 4.6 | 4.3 | 4.3 | 5 | 4.3 | 5.5 |
| | Flash point (° C.) | 93 or higher | 93 or higher | 93 or higher | 93 or higher | 93 or higher | 93 or higher | 93 or higher | lower than 70 |
| | Z-8 curability mJ/cm$^2$ (the number of passes) | 30 (1) | 30 (1) | 30 (1) | 30 (1) | 30 (1) | 30 (1) | 30 (1) | 30 (1) |
| | Adhesion | fair | good | good | good | good | good | good | good |
| | Solvent resistance | good | poor | poor | poor | poor | poor | poor | good |
| | Cockling | good | good | good | good | good | good | good | good |
| | Ejection stability | good | good | good | good | good | good | good | poor |
| | LED curability mJ/cm$^2$ (the number of irradiations) | 30 (1) | 40 (1) | 30 (1) | 30 (1) | 30 (1) | 30 (1) | 30 (1) | 40 (1) |
| | Adhesion | fair | good | good | good | good | good | good | good |
| | Solvent resistance | good | poor | poor | poor | poor | poor | poor | good |
| | Cockling | good | good | good | good | good | good | good | good |
| | Ejection stability | good | good | good | good | good | good | good | poor |
| | Change in color of cured coating film | good | good | good | good | good | good | good | good |
| | GHS Hazard information | No acute toxicity | No acute toxicity | No acute toxicity | No acute toxicity | No acute toxicity | No acute toxicity | No acute toxicity | No acute toxicity |

TABLE 3

| | | Black | Yellow | Cyan | Magenta | White | Clear | Bleeding | Adhesion | Solvent resistance | Cockling | Change in color |
|---|---|---|---|---|---|---|---|---|---|---|---|---|
| Example | 3 | 7 | 10 | 12 | 14 | 16 | not observed | good | good | good | good |
| Example | 5 | 7 | 10 | 12 | 14 | 16 | not observed | good | good | good | good |
| Example | 6 | 7 | 10 | 12 | 14 | 16 | not observed | good | good | good | good |
| Example | 4 | 8 | 11 | 13 | 15 | 17 | not observed | good | good | good | good |

Table 2 shows that the ink compositions according to the examples showed good results in each evaluation.

Table 3 shows that the ink sets of any combination of the ink compositions according to the examples caused no bleeding.

The black ink composition according to Comparative Example 1 had poor LED curability because it was free of a thioxanthone photoinitiator. The ink compositions according to Comparative Examples 2 to 5 gave poor results in the evaluation of change in color of the cured coating film because they contained a thioxanthone photoinitiator. The ink compositions according to Comparative Examples 6 to 11 contained less benzyl acrylate and thus showed poor results in the evaluation of adhesion. The ink compositions according to Comparative Examples 12 to 17 contained less vinyloxyethoxyethyl acrylate and thus showed poor results in the evaluation of solvent resistance. The ink composition according to Comparative Example 18 had a low flash point and high viscosity, and showed poor results in the evaluation of ejection stability.

INDUSTRIAL APPLICABILITY

The ink set of the present invention, which has the above-described features, has excellent curability under LED light, provides a printed material without coloration or fading due to a photoinitiator. The ink set also prevents color mixing in image formation, has good adhesion to polyvinyl chloride-based sheets, and sufficiently prevents cockling. The ink set further has very low viscosity as well as a high flash point and low skin irritation.

The invention claimed is:

1. An ink set comprising: at least two photocurable ink compositions for inkjet printing selected from the group consisting of a yellow ink composition, a magenta ink composition, a cyan ink composition, a black ink composition, a white ink composition, and a clear ink composition,
the photocurable ink compositions for inkjet printing each independently having a flash point of 70° C. or higher as measured using a SETA closed-cup flash point tester in accordance with JIS K 2265 and a viscosity at 25° C. of 5 mPa·s or less,
the yellow ink composition, the magenta ink composition, the cyan ink composition, the black ink composition, and the white ink composition each independently containing at least a pigment, photopolymerizable compounds, and a photopolymerization initiator,
the clear ink composition containing at least photopolymerizable compounds and a photopolymerization initiator,
the magenta ink composition, the cyan ink composition, and the clear ink composition each independently containing vinyloxyethoxyethyl acrylate in an amount of 4 to 40% by mass, benzyl acrylate in an amount of 10 to 65% by mass, and N-vinylcaprolactam in an amount of 5 to 35% by mass as the photopolymerizable compounds,
the magenta ink composition, the cyan ink composition, and the clear ink composition each independently containing an acylphosphine oxide photopolymerization initiator as the photopolymerization initiator and being free of a thioxanthone photopolymerization initiator,
the yellow ink composition containing vinyloxyethoxyethyl acrylate in an amount of 4 to 40% by mass, benzyl acrylate in an amount of 10 to 65% by mass, and N-vinylcaprolactam in an amount of 5 to 35% by mass as the photopolymerizable compounds,
the yellow ink composition containing an acylphosphine oxide photopolymerization initiator as the photopolymerization initiator,
the black ink composition containing vinyloxyethoxyethyl acrylate in an amount of 4 to 40% by mass, benzyl acrylate in an amount of 10 to 65% by mass, and N-vinylcaprolactam in an amount of 5 to 35% by mass as the photopolymerizable compounds,
the black ink composition containing a thioxanthone photopolymerization initiator and a acylphosphine oxide photopolymerization initiator as the photopolymerization initiator,
the white ink composition containing vinyloxyethoxyethyl acrylate in an amount of 4 to 40% by mass and benzyl acrylate in an amount of 10 to 65% by mass as the photopolymerizable compounds,
the white ink composition containing an acylphosphine oxide photopolymerization initiator as the photopolymerization initiator and being free of a thioxanthone photopolymerization initiator.

2. The ink set according to claim 1,
wherein the total amount of monofunctional monomers as photopolymerizable compounds in each of the photocurable ink compositions for inkjet printing is 45% by mass or more.

3. A printed material obtainable by printing on a polyvinyl chloride-based sheet using the ink set according to claim 1.

* * * * *